US006226906B1

(12) United States Patent
Bar-Yona

(10) Patent No.: US 6,226,906 B1
(45) Date of Patent: May 8, 2001

(54) DISPLAY UNITS

(75) Inventor: Itzchak Bar-Yona, Rosh Ha'Ayin (IL)

(73) Assignee: M.V.T. Multi Vision Technologies Ltd., Rosh Ha'Ayin (IL)

( * ) Notice: Subject to any disclaimer, the term of this patent is extended or adjusted under 35 U.S.C. 154(b) by 0 days.

(21) Appl. No.: 09/089,337

(22) Filed: Jun. 3, 1998

(30) Foreign Application Priority Data

Jun. 5, 1997 (IL) ........................................ 121005

(51) Int. Cl.[7] .......................... G09F 19/14; G03B 25/02

(52) U.S. Cl. ................................ 40/454; 40/453; 40/466; 40/470; 40/509; 40/508; 40/437

(58) Field of Search ............................ 40/454, 453, 466, 40/470, 509, 508, 436, 437

(56) References Cited

U.S. PATENT DOCUMENTS

| | | | | |
|---|---|---|---|---|
| 3,604,536 | | 9/1971 | Dinnerstein . | |
| 3,613,277 | * | 10/1971 | Rose et al. | 40/437 X |
| 3,686,781 | * | 8/1972 | Calhoun, Jr. | 40/454 X |
| 5,007,190 | * | 4/1991 | Shyu | 40/574 X |
| 5,276,987 | * | 1/1994 | Honse | 40/509 X |
| 5,416,997 | | 5/1995 | Dyment et al. . | |
| 5,426,879 | | 6/1995 | Hecker . | |
| 5,513,458 | * | 5/1996 | Dehli | 40/470 |
| 5,724,758 | * | 3/1998 | Gulick, Jr. | 40/454 |
| 5,760,572 | | 6/1998 | Takeda et al. . | |

FOREIGN PATENT DOCUMENTS

| | | | | |
|---|---|---|---|---|
| 2-211437 | * | 8/1990 | (JP) | 40/454 |
| WO 90/14782 | | 12/1990 | (WO) . | |
| WO 95/30176 | | 11/1995 | (WO) . | |

* cited by examiner

*Primary Examiner*—Terry Lee Melius
*Assistant Examiner*—Rodrigo J. Morales
(74) *Attorney, Agent, or Firm*—Oblon, Spivak, McClelland, Maier & Neustadt, P.C.

(57) ABSTRACT

The invention provides a self-powered display unit for displaying at least two consecutively changing images to be viewed by a viewer, the unit comprising a housing, at least one wall portion of the housing being made of an array of linear lenses having a lenticular front face and a flat rear face; at least one displaceable, light-weight, substantially planar indicia carrier disposed inside the housing at a distance from the rear face at most equalling the focal length of the lenses, and a high efficiency, low energy consumption, battery-powered DC drive means for periodically displacing the indicia carrier for a distance at least equalling the distance between two adjacent lenses of the array.

15 Claims, 6 Drawing Sheets

DISPLAY UNITS

FIELD OF THE INVENTION

The present invention relates to display units, and in particular to display units for displaying two or more consecutively changing images to be viewed by a viewer.

BACKGROUND OF THE INVENTION

Multi-image display devices of various kinds are known. Such devices are used for advertisement, instructional purposes, providing directions, games and many other uses. These devices usually contain prisms revolving about their axes, or alternatively, devices projecting movies in a closed cycle. All such devices, however, require a substantial amount of electrical power for their operation, hence requiring connection to electrical mains. Furthermore, such devices are of necessity of a substantial size, due to the relative complexity of the required drive means and other parts thereof.

The basic optical principle of displacing a complex lithographic print relative to a lenticular lens array has been known from the prior art, e.g., U.S. Pat. No. 5,494,445, which discloses general know-how for alternatively displaying several images. However, to date, this knowledge has not been properly utilized for advertising purposes. There exists a need for a dynamic, multi-image display to be used in shopping centers and other locations, which is capable of functioning independently when affixed to walls or attached to shelves, and which will present information regarding the products to be sold.

Such a display should be self-powered, namely, free of any connection to the mains. It must have the ability to present high-resolution images at a wide range of viewing angles, sometimes on both of its sides, for viewing by observers approaching from different directions. Maintenance considerations require an operating period of at least 3 to 4 months without battery replacement. The advertising messages must be easily replaceable by an unskilled worker on site, without any difficulty. The display unit should be cost-effective; in other words, its cost should not exceed the price of the product(s) it promotes.

SUMMARY OF THE INVENTION

It is therefore a broad object of the present invention to provide a simple, inexpensive display unit based on optical principles, which is capable of consecutively displaying several high-resolution images and does not require connection to electrical mains.

It is a further object of the present invention to provide a display unit for displaying a multiplicity of small or large consecutively changing images, which is capable of operating over an extended period of time and is powered by an independent power source.

It is another further object of the present invention to provide a cost-effective advertising display in which the message to be projected is easily replaceable and may be changed by an unskilled maintenance attendant having no technical background.

In accordance with the present invention, there is therefore provided a self-powered display unit for displaying at least two consecutively changing images to be viewed by a viewer, said unit comprising a housing, at least one wall portion of the housing being made of an array of linear lenses having a lenticular front face and a flat rear face; at least one displaceable, light-weight, substantially planar indicia carrier disposed inside the housing at a distance from the rear face at most equalling the focal length of the lenses, and a high efficiency, low energy consumption, battery-operated DC drive means for periodically displacing the indicia carrier for a distance at least equalling the distance between two adjacent lenses of the array.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF PREFERRED EMBODIMENTS

Figure 1:
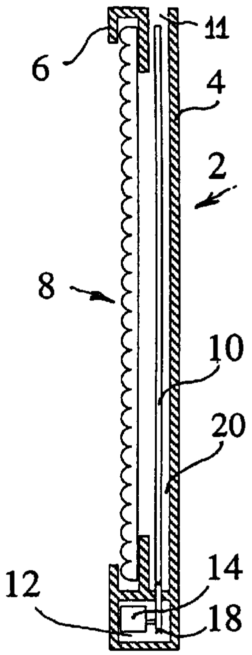
FIG. 1 is a cross-sectional view of the unit according to the present invention.
Figure 2:
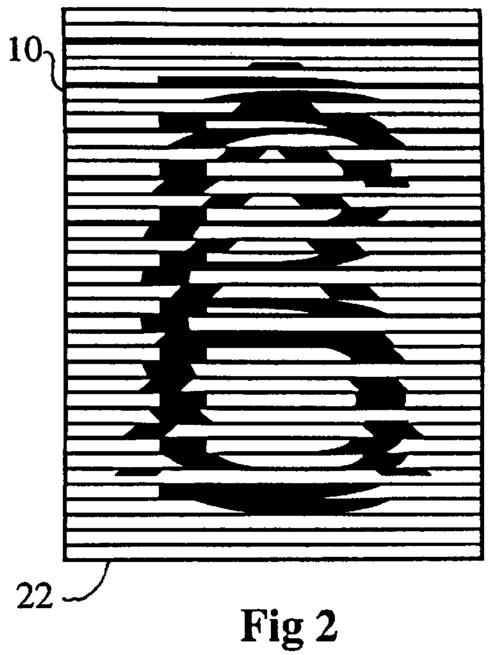
FIG. 2 is a front view of an indicia carrier for displaying changing images in accordance with the present invention.
Figure 3:
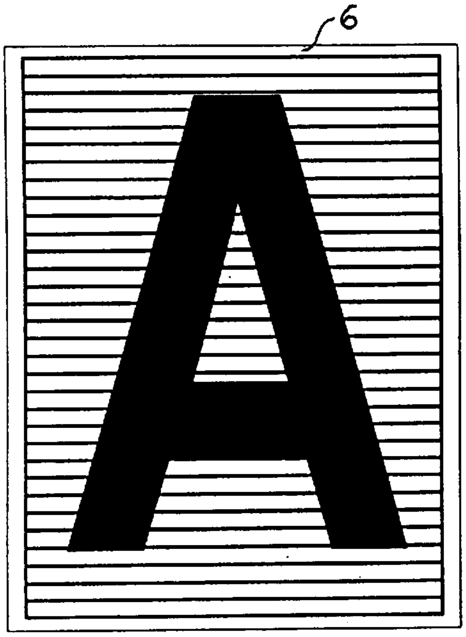
FIG. 3 is a front view of the unit, displaying the letter A.

With reference to FIGS. 1–3, there is seen a display unit 2 for displaying two or more consecutively changing images to be viewed by a viewer even without moving the line of sight. Unit 2 is composed of a housing 4 having a front face 6, constituted by an array of lenses 8. The lenses could be arranged to form a horizontally extending linear array as seen in FIG. 1, or alternatively, can constitute an array of a honeycomb, spherical, or other arrangement.

Behind the stationary front face 6, there is movably disposed a light-weight indicia carrier 10. The indicia carrier 10 is in the form of a sheet or film on one or two of its surfaces, upon which are printed indicia in a manner per se known, e.g., from U.S. Pat. No. 5,100,330 or 5,488,451, or by any other method. The optical principle on which such methods are based is the ability to make visible each one of the multiple images printed on the surface(s) of semi-transparent or substantially transparent indicia carrier 10, by a minimal displacement thereof with respect to the array of lenses 8.

The indicia carrier 10 may be easily replaced with another, similar carrier by pulling the carrier out of slot 11 and slipping in a replacement carrier. This can be accomplished by any unskilled person.

Figure 4:
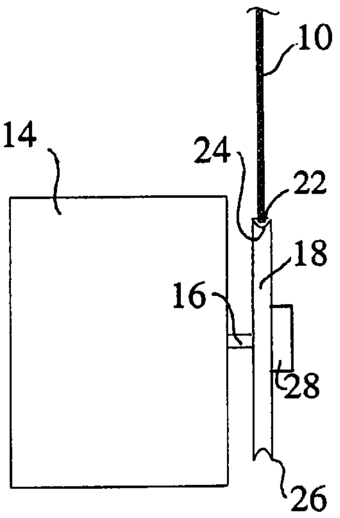
FIG. 4 is a schematic side view of the drive means and an eccentric attached thereto.

As seen in FIGS. 1 and 4, unit 2 further comprises a compartment 12 located at the bottom part of housing 4, which compartment accommodates electrically powered drive means 14 having an output axis 16. The details of construction of drive means 14 will be described hereinafter. On output axis 16 there is mounted an eccentric 18, seen to better advantage in FIG. 5, a limited portion of the periphery of which is arranged to project into the chamber 20 within which indicia carrier 10 is located, thereby causing the bottom edge 22 of the indicia carrier 10 to make contact with the bottom of a groove 24 provided along the circumference 26 of eccentric 18. Carrier 10 is freely supported within groove 24, but it is prevented from slipping off eccentric 18 when the latter rotates.

Figure 5:
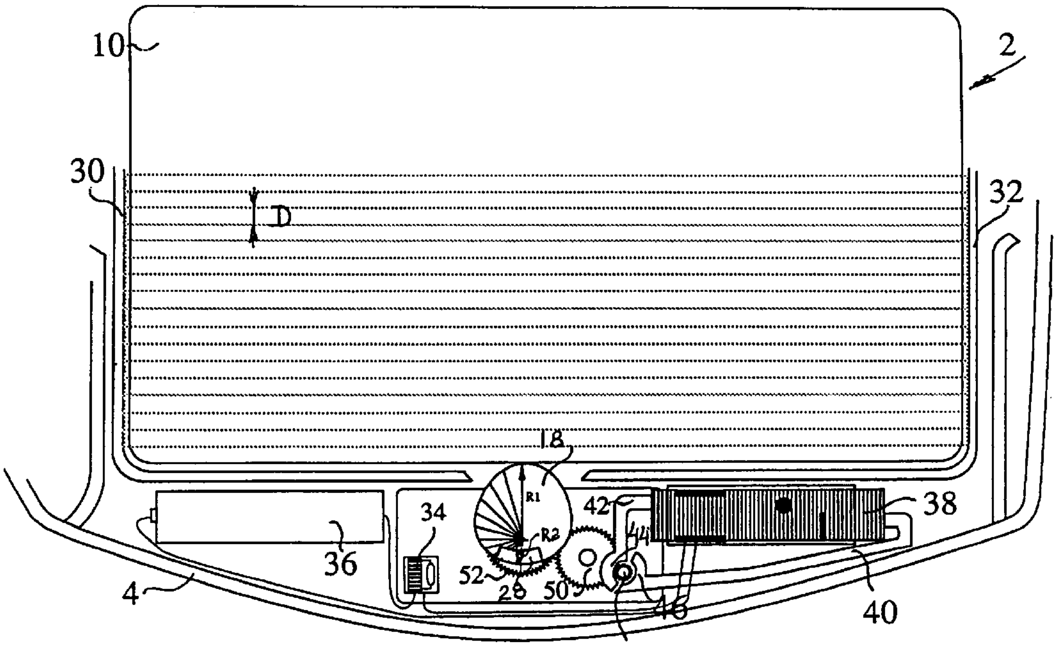
FIG. 5 is a frontal, partially cross-sectional view of a display unit, incorporating and showing in detail the drive means for actuating an eccentric similar to that of FIG. 4.

Referring now to FIG. 5, there is shown a front view of eccentric 18, on which, for illustrative purposes, there are drawn the longer radius $R_1$ and the shorter radius $R_2$, the difference between which constitutes the displacement distance of indicia carrier 10. Optionally, eccentric 18 is furnished with a weight 28 disposed about the periphery at shorter radius $R_2$, the purpose of which weight is to counterbalance some of the indicia carrier's weight upon its displacement in the upward direction.

A more detailed illustration of the invention is shown in FIG. 5, illustrating split housing 4, indicia carrier 10, guides 30, 32 for guiding the movement of the indicia carrier, and eccentric 18, on the circumference of which indicia carrier 10 rests. Also shown is the high-efficiency, low energy consumption drive means 14 for rotating eccentric 18, including electronic oscillator 34 powered by battery 36 and connected to electromagnet 38 having two ferromagnetic arms 40, 42. Each of the free ends of arms 40, 42 is configured as an armature 44, 46, surrounding but not contacting a magnetic core 48, directly or indirectly coupled to transmission gears 50, 52 for driving eccentric 18. Each pulse emitted by the oscillator effects a 180° rotation of core 48. The eccentric's contour is such that its rotation is translated into a linear displacement of the indicia carrier 10, which is freely supported on the grooved circumference of the eccentric, as described above. The radii $R_1$ and $R_2$ of eccentric 18 are calculated such that the total linear displacement of indicia carrier 10 in the upward and downward directions will be a distance at least equal to the distance D between two focal lines of two adjacent lenses located in the direction of displacement. The displacement of indicia carrier 10 by such an amplitude will effect a consecutive display of the images formed on the indicia carrier's surface. As indicia carrier 10 is of minimal weight, and in view of the efficient drive means described above, which uses energy only during the relatively short duration of the pulse generated by oscillator 34, the power required to operate the unit is also minimal; thus, the unit can operate over extended periods of time without requiring a change of battery. Naturally, the unit may also be powered or aided by solar cells.

Figure 6:
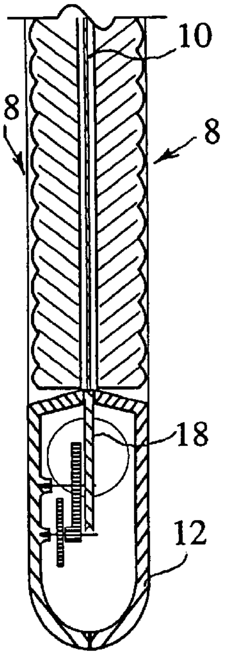
FIG. 6 is a cross-sectional view of a further embodiment of a display unit according to the present invention.

While in FIGS. 1–5 there is illustrated a unit displaying images on one side only, FIG. 6 illustrates an embodiment in which the changing images are displayed on two opposite sides of the unit. For achieving this, all that is required is to provide a second array of lenses 8' on the other face of the unit and to provide images on both surfaces of indicia carrier 10. Otherwise, the structure and operation of this embodiment are the same as described above with reference to FIGS. 1–5.

Figure 7:
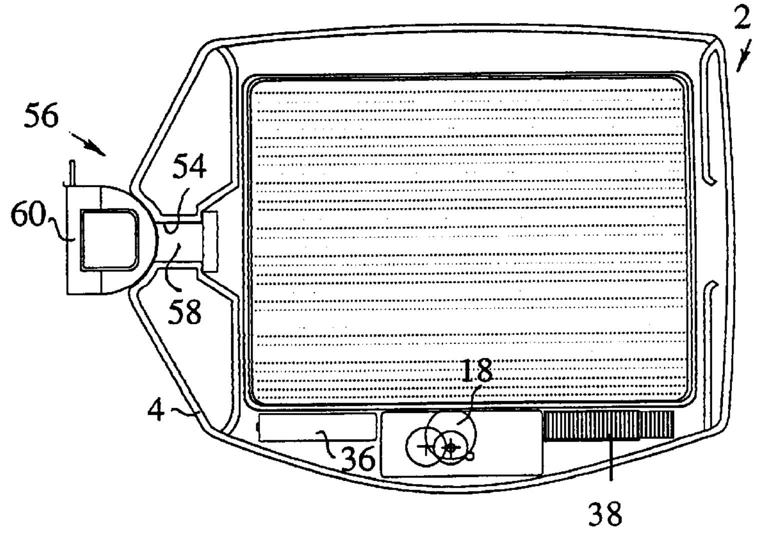
FIG. 7 is a partial, frontal, cross-sectional view of the display unit and a fitting for attaching it to a shelf.

FIG. 7 illustrates a cross-sectional view of a split housing 4 formed with a suitable opening 54 which engages fitting 56 for attaching unit 2 to a shelf, e.g., a merchandise display shelf in a supermarket or department store. Fitting 56 is designed to facilitate a flexible connection with unit 2 and a more rigid connection to a shelf, to avoid breaking if the unit is accidentally bumped by a passing customer or worker. The flexible connection between fitting 56 and unit 2 is achieved by means of an arm 58 engaging the opening 54 and held therein by friction. The more rigid connection is achieved by means of a metallic bracket 60.

Figure 9:
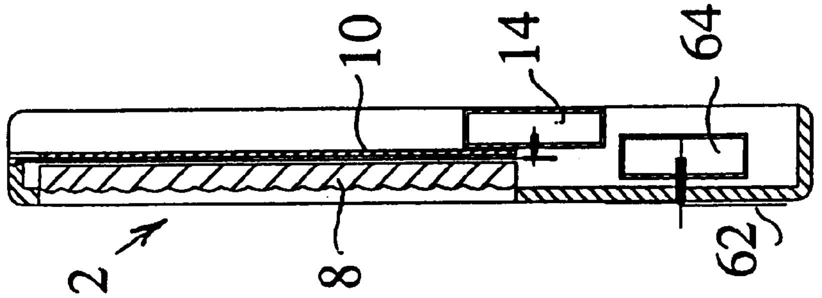
FIGS. 8 and 9 are frontal and cross-sectional views, respectively, of a display unit according to the present invention and incorporating a clock.
Figure 8:
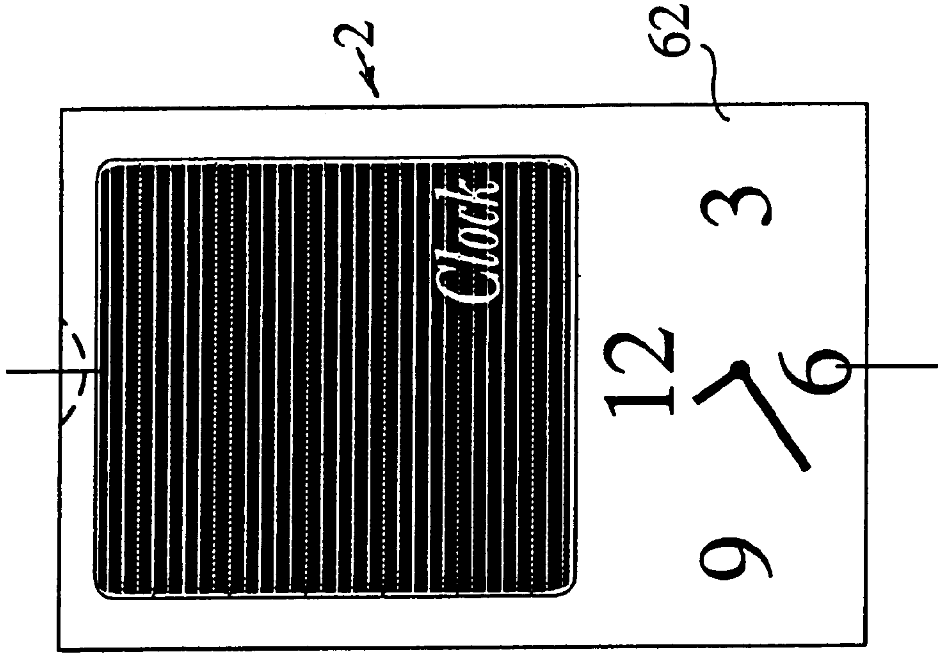

FIGS. 8–11 illustrate two embodiments for utilizing the display unit of the present invention in conjunction with a clock. The first of these embodiments is illustrated in FIGS. 8 and 9, and shows a clock 62, operated by means of standard clock movement 64 disposed inside the housing 4 of unit 2, thus providing a combined clock and changing display unit. Obviously, the clock of FIG. 8 can also be a digital clock. In the second embodiment, illustrated in FIGS. 10 and 11, the changing displays are positioned behind the clock face. Such positioning facilitates both the operation of clock 62 and changing of the displays on indicia carrier 10, by means of a common drive means 14.

Figure 11A:
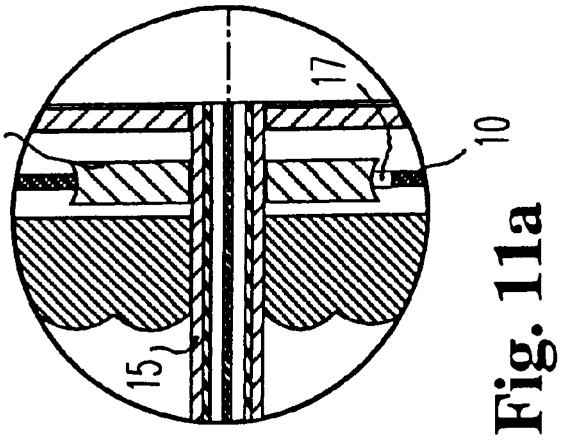
FIG. 11A is an enlarged detailed view of the encircled portion in FIG. 11.
Figure 11:
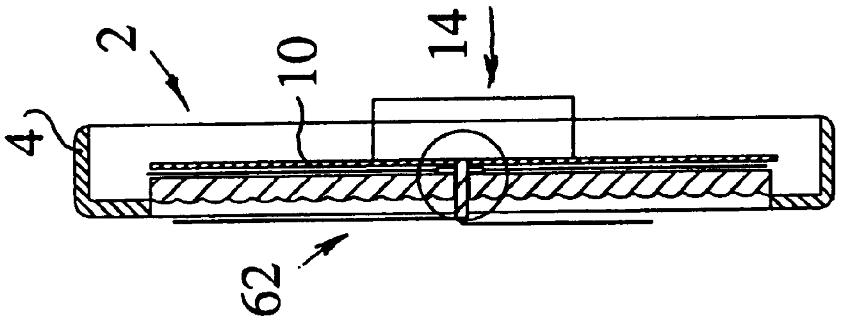
FIGS. 10 and 11 are frontal and cross-sectional views, respectively, of a further embodiment of a display unit incorporating a clock.
Figure 10:
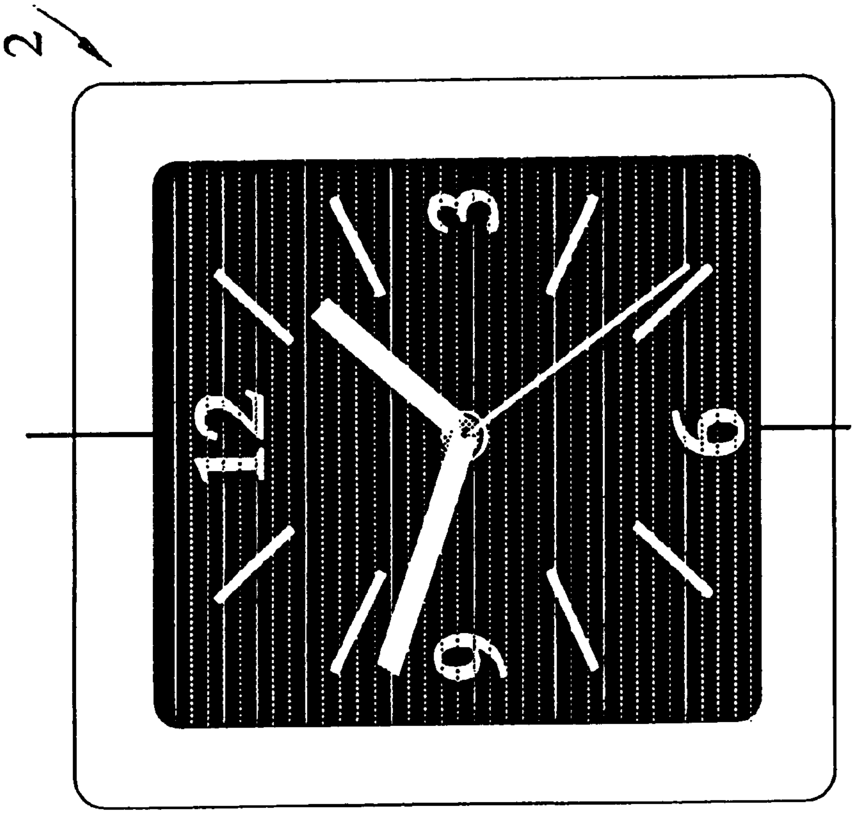

As shown in FIG. 11A, eccentric 18 is fixedly attached to and driven by the seconds shaft 15 of common drive means 14 and moves inside a central hole 17 of suitable shape and size in carrier 10.

Figure 12:
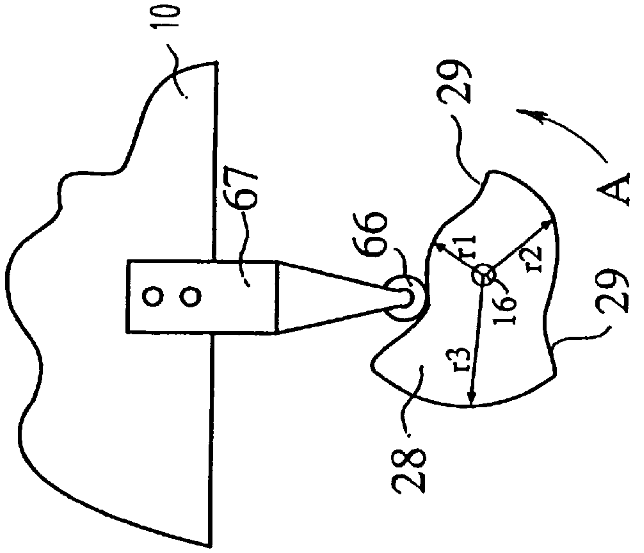
FIG. 12 illustrates a cam producing a stepwise movement of the indicia carrier.

FIG. 12 shows an eccentric 28 or, more correctly, a cam, having three different radii of curvature $r_1$, $r_2$, $r_3$, as well as ramps 29 leading from one curvature to the adjacent one. Also shown is a cam follower in the form of a roller 66 mounted in a fork 67 fixedly attached to indicia carrier 10. It is clear that when cam 28 rotates in the direction of arrow A, the roller 66 will start rolling along curvature $r_1$. Since curvature $r_1$ is concentric with shaft 16, carrier 10 will remain stationary until roller 66, together with carrier 10, are lifted onto the next curvature $r_2$ by the ramp 29, from which point the roller 66 will "dwell" again until it is lifted once more by the next ramp 29 onto the next curvature $r_3$, at which point the indicia carrier 10 will have reached its maximum displacement. Reaching the end of curvature $r_3$, roller 66 will drop onto curvature $r_1$, with carrier 10 again at its lowermost point. The cam thus has three "dwelling" portions and three ramps, and will turn a uniform rotation of its shaft 16 into a stepwise rise of indicia carrier 10. Such a cam is particularly useful for large display units observed from considerable distances, where the line of sight does not greatly deviate from the perpendicular relative to the unit.

The preparation of indicia carriers demands great accuracy, particularly in the dimensional relationship of indicia parameters and the pitch of the array of the lenses. While such accuracy is definitely achievable with small display units, it cannot possibly be realized with large units, because of inevitable cumulative errors in the preparation of the indicia carrier, the effects of temperature fluctuations, etc. Although in principle such problems could be alleviated by increasing the width of the linear lenses of the array, such a step would have serious disadvantages of its own:

1) As increasing the width of linear lenses, defined in cross-section by a circular arc, automatically also increases the lens thickness, arrays of lenses of increased width would be very heavy and, consequently, expensive.
2) The corrugated surfaces of the array produce highlights and glare, which interfere with the visibility of the image. They are also prone to dust deposition.

Figure 13:
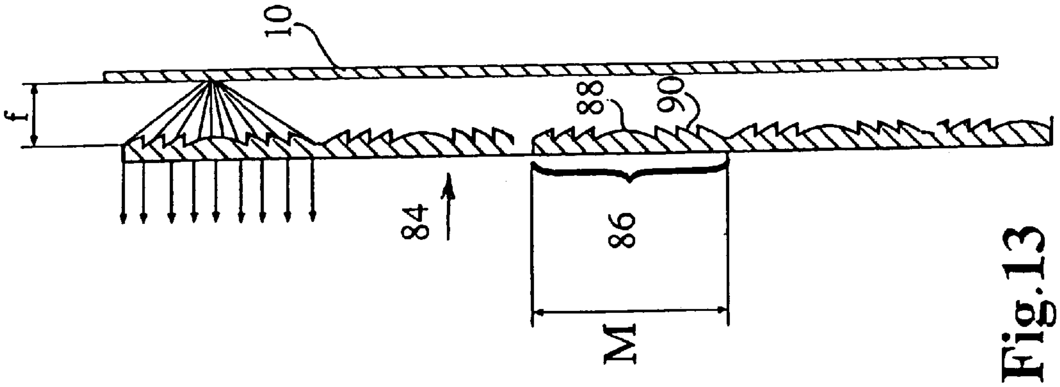
FIG. 13 is a schematic, cross-sectional view of an array of linear lenses having a cross-section conforming with that of per se known Fresnel lenses.
Figure 14:
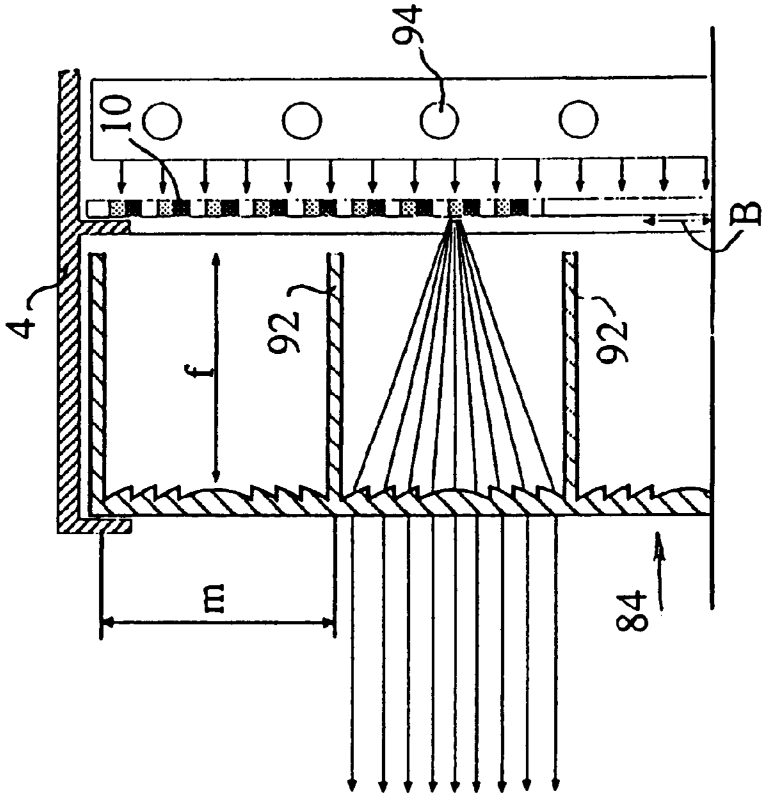
FIG. 14 is a cross-sectional view of a display unit including the array of lenses shown in FIG. 13.

A solution to the above problems is provided by the array of lenses depicted in FIGS. 13 and 14. This array is constituted by co-planar, advantageously internal groups of linear lenses having a cross-section conforming with that of the per se known Fresnel lenses, each group consisting of a central, substantially cylindrical lens, flanked by a number of quasi-prismatic linear lenses (quasi, because, strictly speaking, the slanting surfaces of these prisms are parts of cylindrical surfaces). Because of their large f number [in the case of the linear Fresnel lens, focal length f/width m (FIG. 13)], this type of lens offers a relatively large width (e.g., 40 mm) combined with a reasonably short focal length.

FIG. 13 is a schematic representation of a display unit using the above-mentioned array of quasi-prismatic linear lenses. There is seen in FIG. 13 an indicia carrier 10, located at a distance f behind an array 84 of the above-mentioned lenses. Array 84 is comprised of a plurality of groups 86, each group consisting of a central, substantially cylindrical lens 88, flanked by a plurality of linear, quasi-prismatic lenses 90. Advantageously, array 84 is one integral whole, e.g., produced by extrusion or embossing, although it can also be built up from several parts, particularly for large display units. As can be seen, the surface facing the viewer is completely smooth and is far less subject to reflective and glare phenomena and dust accretion.

FIG. 14 shows a display unit in which the array 84 of FIG. 13 is produced by extrusion and is provided with ribs 92, which both stiffen array 84 and prevent indicia carrier 10 from bulging. Carrier 10 is moved up and down, as indicated by double arrow B, by any of the previously described means. The display unit of FIG. 14 can also be provided with a light source, such as a battery of fluorescent tubes 94.

Figure 15:
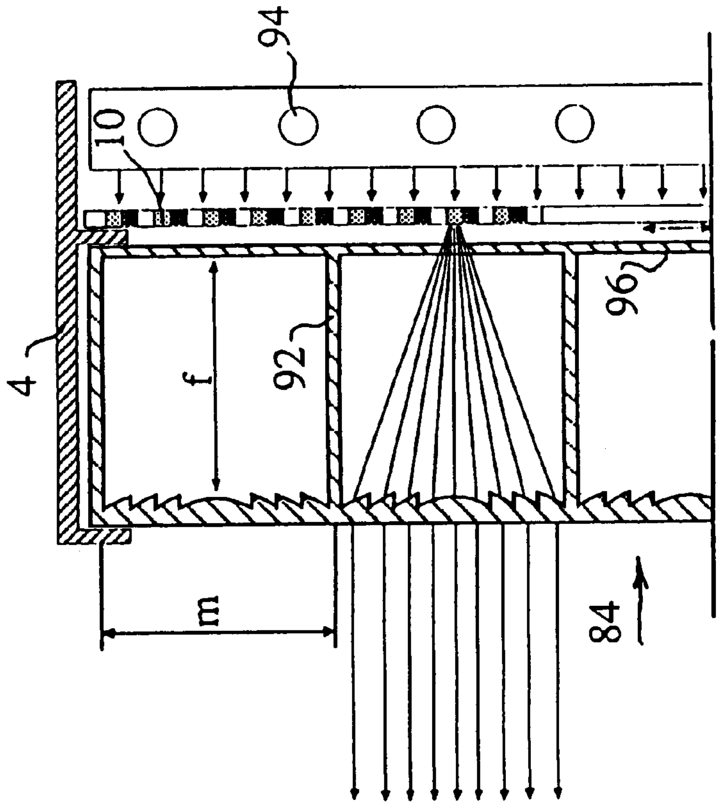
FIG. 15 is a cross-sectional view of a display unit in which the array of lenses shown in FIG. 13 is an integral part of a hollow, extruded panel.

The unit of FIG. 15 is similar to that of FIG. 14, except that array 84 constitutes the front surface of a hollow, extruded panel, the rear surface 96 of which is connected to array 84 by means of ribs 92. This embodiment is thus exceptionally rigid and is therefore suitable for very large display units.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A self-powered display unit for displaying at least two consecutively changing images to be viewed by a viewer, said unit comprising:

a housing having at least two wall portions defining a cavity therebetween, at least one of said wall portions being made of an array of linear lenses having a lenticular front face and a flat rear face;

at least one displaceable, light-weight, and substantially planar indicia carrier comprising a replaceable film slidably received through a slot in a surface of said housing and disposed inside said cavity at a distance from said rear face at most equalling a focal length of the lenses; and a high efficiency, low energy consumption, battery-powered DC drive means for periodically displacing said indicia carrier for a distance at least equalling the distance between two adjacent lenses of said array;

said drive means comprising a motor coupled to a cam, a portion of a bottom edge of said indicia carrier being supported by said cam.

2. The display unit as claimed in claim 1, wherein said motor is an electric motor powered by a solar cell arrangement.

3. The display unit as claimed in claim 1, wherein said motor is an impulse-driven stepping motor having a shaft.

4. The display unit as claimed in claim 3, wherein said impulse-driven stepping motor produces impulses and each of the impulses produced by said impulse-driven stepping motor rotates the shaft of said stepping motor by 180°.

5. The display unit as claimed in claim 3, wherein said shaft rotates at a speed between 2 and 4 r.p.m.

6. The display unit as claimed in claim 2, wherein said cam is an eccentric.

7. The display unit as claimed in claim 2, wherein said cam is provided with a peripherally disposed weight to counterbalance at least some of said indicia carrier's weight upon its displacement in the upward direction.

8. The display unit as claimed in claim 1, wherein said indicia carrier is translucent so as to allow light to pass therethrough.

9. The display unit as claimed in claim 1, wherein said at least two wall portions are parallel to one another, a second of said wall portions is made of an array of lenses, and said indicia carrier comprises displayable indicia on both of its sides for simultaneously displaying images on two sides of said unit.

10. The display unit as claimed in claim 1, wherein said housing further comprises means for affixing the unit onto a shelf.

11. The display unit as claimed in claim 1, wherein said replaceable film comprises:

a sheet.

12. The display unit as claimed in claim 1, wherein a total rise of said cam substantially equals a required displacement distance of said indicia carrier.

13. The display unit as claimed in claim 1, wherein said display unit forms a clock with a changing clock face.

14. The display unit as claimed in claim 13, wherein said cam is fixedly attached to a seconds shaft of a standard clock drive.

15. The display unit as claimed in claim 1, wherein each of the linear lenses has a cross-section conforming with a cross-section of a Fresnel lens, and said array of linear lenses forms a front wall of an extruded, hollow, two-sided panel, a rear wall of said two-sided panel being connected to said front wall by a plurality of ribs.

* * * * *